US011080472B2

(12) United States Patent
Matsuda et al.

(10) Patent No.: US 11,080,472 B2
(45) Date of Patent: *Aug. 3, 2021

(54) INPUT PROCESSING METHOD AND INPUT PROCESSING DEVICE

(71) Applicant: FUJITSU LIMITED, Kawasaki (JP)

(72) Inventors: Yugo Matsuda, Machida (JP); Yasuhiro Tsuyuki, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

This patent is subject to a terminal disclaimer.

(21) Appl. No.: 15/726,695

(22) Filed: Oct. 6, 2017

(65) Prior Publication Data

US 2018/0032495 A1 Feb. 1, 2018

Related U.S. Application Data

(63) Continuation of application No. PCT/JP2015/062610, filed on Apr. 24, 2015.

(51) Int. Cl.
G06F 40/171 (2020.01)
G06F 3/0488 (2013.01)
G06F 3/023 (2006.01)
G06K 9/22 (2006.01)
G06K 9/03 (2006.01)
(Continued)

(52) U.S. Cl.
CPC .......... G06F 40/171 (2020.01); G06F 3/0233 (2013.01); G06F 3/0488 (2013.01); G06K 9/00416 (2013.01); G06K 9/033 (2013.01); G06K 9/222 (2013.01); G06K 9/3233 (2013.01);
(Continued)

(58) Field of Classification Search
CPC .... G06F 17/242; G06F 3/0233; G06F 3/0488; G06F 3/04883; G06K 2209/01; G06K 9/00416; G06K 9/033; G06K 9/222; G06K 9/62
See application file for complete search history.

(56) References Cited

U.S. PATENT DOCUMENTS 5,907,852 A    5/1999 Yamada
6,021,218 A *  2/2000 Capps .................... G06K 9/222
                                                      382/187
7,113,178 B1 * 9/2006 Webb .................. G06F 3/04883
                                                      345/173
(Continued)

FOREIGN PATENT DOCUMENTS

CN    1802689 A    7/2006
CN    102156608    8/2011
(Continued)

OTHER PUBLICATIONS

International Search Report dated Jun. 2, 2015 corresponding to International Patent Application No. PCT/JP2015/062610.
(Continued)

Primary Examiner — Jennifer N To
Assistant Examiner — Reji Kartholy
(74) Attorney, Agent, or Firm — Staas & Halsey LLP

(57) ABSTRACT

An input processing method executed by a computer includes receiving a handwriting input on a display screen on which a character is displayed; and in response to detecting that the handwriting input has been performed at a position corresponding to a display position of a specific character displayed on the display screen, executing a process of changing the specific character into a character recognized with respect to the handwriting input.

17 Claims, 12 Drawing Sheets

US 11,080,472 B2
Page 2

(51) Int. Cl.
*G06K 9/32* (2006.01)
*G06K 9/00* (2006.01)

(52) U.S. Cl.
CPC ...... *G06F 3/04883* (2013.01); *G06K 2209/01* (2013.01)

(56) References Cited

U.S. PATENT DOCUMENTS

| | | |
|---|---|---|
| 2003/0189603 A1 | 10/2003 | Goyal et al. |
| 2005/0099406 A1* | 5/2005 | Pettiross ............... G06F 3/0236 345/179 |
| 2006/0210163 A1* | 9/2006 | Garside ............... G06F 3/04883 382/186 |
| 2006/0221064 A1 | 10/2006 | Sawada |
| 2009/0007014 A1 | 1/2009 | Coomer et al. |
| 2011/0131515 A1 | 6/2011 | Ono et al. |
| 2012/0121181 A1* | 5/2012 | Markiewicz .......... G06F 3/0237 382/186 |
| 2012/0216141 A1* | 8/2012 | Li ...................... G06K 9/00416 715/780 |
| 2013/0314337 A1 | 11/2013 | Asano |
| 2013/0314363 A1 | 11/2013 | Zhen et al. |
| 2015/0154442 A1 | 6/2015 | Takahashi et al. |
| 2016/0070462 A1 | 3/2016 | Baudry et al. |

FOREIGN PATENT DOCUMENTS

| | | |
|---|---|---|
| CN | 102214043 | 10/2011 |
| CN | 103824072 | 5/2014 |
| CN | 104520877 | 4/2015 |
| JP | 7-57053 | 3/1995 |
| JP | 8-212197 | 8/1996 |
| JP | 2001-337993 | 12/2001 |
| JP | 2003-178257 | 6/2003 |
| JP | 2005-235116 | 9/2005 |
| JP | 2007 511003 | 4/2007 |
| JP | 2008-242541 | 10/2008 |
| JP | 2010-532059 | 9/2010 |
| JP | 2011-111061 | 6/2011 |
| JP | 2012-238295 | 12/2012 |
| JP | 2013-12084 | 1/2013 |
| JP | 2013-246633 | 12/2013 |

OTHER PUBLICATIONS

Written Opinion of the International Search Authority dated Jun. 2, 2015 corresponding to International Patent Application No. PCT/JP2015/062610.

European Patent Office English Abstract for Japanese Patent Publication No. 2005-235116, published Sep. 2, 2005.
World Intellectual Property Organization English abstract for International Publication No. 2005/04700 A2 corresponding to Japanese Patent Publication No. 2007-511003, published May 26, 2005
European Patent Office English Abstract for Japanese Patent Publication No. 8-212197, published Aug. 20, 1996.
Japanese Platform for Patent Information English Abstract for Japanese Patent Publication No. 2013-12084, published Jan. 17, 2013.
European Patent Office English Abstract for Japanese Patent Publication No. 2003-178257, published Jun. 27, 2003.
European Patent Office English Abstract for Japanese Patent Publication No. 2008-242541, published Oct. 9, 2008.
Japanese Platform for Patent Information English Abstract for Japanese Patent Publication No. 2013-246633, published Dec. 9, 2013.
Office Action dated Mar. 27, 2018, in corresponding Japanese Patent Application No. 2017-513943, 5 pgs.
Extended European Search Report dated Mar. 12, 2018 in Application No. 15889930.2.
Patent Abstracts of Japan, Publication No. 2012-238295, Published Dec. 6, 2012.
Espacenet English abstract for Japanese Patent Publication No. 2001-337993, published Dec. 7, 2001.
Espacenet English abstract for Japanese Patent Publication No. 7-57053, published Mar. 3, 1995.
Espacenet English abstract for Japanese Patent Publication No. 2011-111061, published Jun. 9, 2011.
World Intellectual Property Organization English abstract for International Publication No. 2009/002973 A2 corresponding to Japanese Patent Publication No. 2010-532059, published Sep. 30, 2010.
Office Action for U.S. Appl. No. 15/730,206, dated Apr. 16, 2019.
Extended European Search Report dated Mar. 14, 2018 in corresponding European Patent Application No. 15889929.4.
Japanese Office Action dated Mar. 27, 2018 in corresponding Japanese Patent Application No. 2017-513942.
International Search Report dated Jun. 2, 2015 in corresponding International Patent Application No. PCT/JP2015/062609.
Written Opinion of the International Searching Authority dated Jun. 2, 2015 in corresponding International Patent Application No. PCT/JP2015/062609.
Office Action, dated Jan. 20, 2020, in corresponding Chinese Application No. 201580079183.3 (28 pp.).
Decision of Rejection, dated Apr. 28, 2021, in corresponding Chinese Patent Application No. 201580079183.3 (20 pp.).

\* cited by examiner

FIG.7
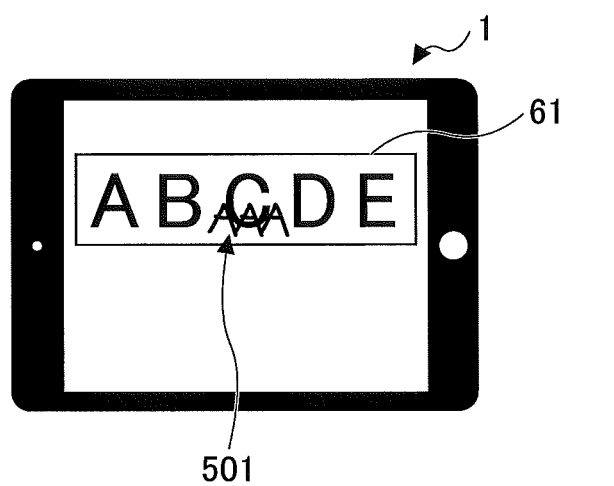
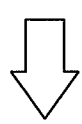
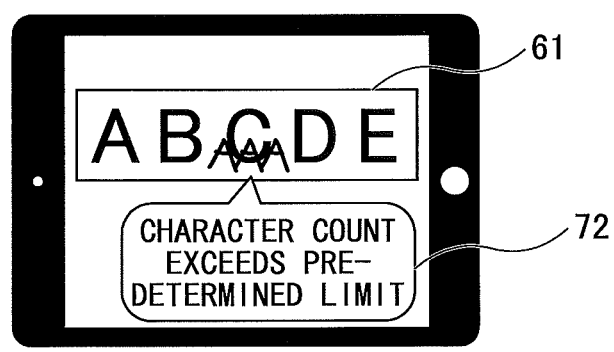

INPUT PROCESSING METHOD AND INPUT PROCESSING DEVICE

CROSS-REFERENCE TO RELATED APPLICATIONS

This application is a continuation application of International Application PCT/JP2015/062610 filed on Apr. 24, 2015, and designated the U.S., the entire contents of which are incorporated herein by reference.

FIELD

The present disclosure relates to an input processing program, an input processing device, an input processing method, a character identification program, a character identification device, and a character identification method.

BACKGROUND

Tools have been known that receive a handwriting input performed by a user, and process recognized characters obtained by applying character recognition to the handwriting input, as input characters.

RELATED-ART DOCUMENTS

Patent Documents

[Patent Document 1] Japanese Laid-Open Patent Application No. 2005-235116

However, when using such a conventional tool, the user is required, before performing the handwriting input, to perform an operation to specify an item or a position where the user wants to input characters by the handwriting input, in addition to the handwriting input, which hinders smooth character input by the handwriting.

SUMMARY

According to an embodiment, an input processing method executed by a computer includes receiving a handwriting input on a display screen on which a character is displayed; and in response to detecting that the handwriting input has been performed at a position corresponding to a display position of a specific character displayed on the display screen, executing a process of changing the specific character into a character recognized with respect to the handwriting input.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 7 is a diagram illustrating protection of a display text;

DESCRIPTION OF EMBODIMENTS

First Embodiment

Figure 1:
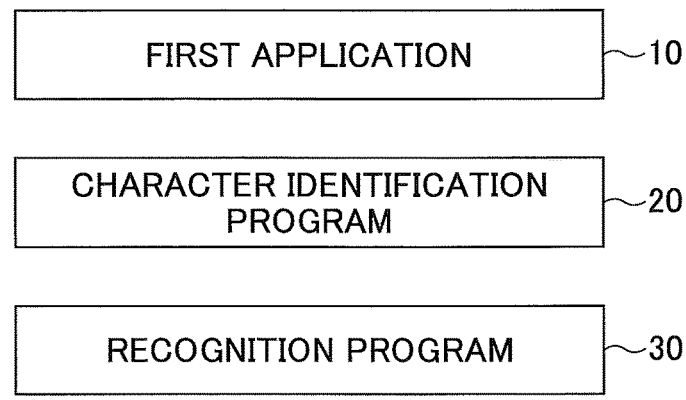
FIG. 1 is a diagram illustrating principal program components in a first embodiment.

In the following, a first embodiment will be described with reference to the drawings. FIG. 1 is a diagram illustrating principal program components in the first embodiment.

The first embodiment includes, as principal programs, a first application 10, a character identification program 20, and a recognition program 30.

The first application 10 is a program that displays a character group (text) having been input, for example, a slip creation application or an email creation application. A text displayed by the first application will be referred to as a "display text" in the following. Note that the display text is not limited to characters input by a handwriting input, and may include, for example, characters input by a keyboard or the like.

When a correction is made to a character in a display text by a handwriting input (or a handwriting correction input), the character identification program 20 identifies a position and a range of a correction target in the display text from input strokes. For example, the character identification program 20 identifies a position and a range in the display text to be replaced with a character input by a handwriting correction input. Similarly, the character identification program 20 identifies a position and a range in the display text to be inserted with a character input by a handwriting correction input. Note that the handwriting input and the handwriting correction input are not limited to input by strokes using a finger, and may be, for example, input by strokes using a stylus or the like.

The recognition program 30 recognizes a character from strokes input by a handwriting input and a handwriting correction input. In other words, the recognition program 30 obtains a character corresponding to strokes input by the handwriting input and the handwriting correction input, as a recognition result.

The first application 10, the character identification program 20, and the recognition program 30 in the first embodiment may be implemented on independent devices, respectively, or may be implemented in a single device. In the following description of the first embodiment, a case will be described where the first application 10, the character identification program 20, and the recognition program 30 are implemented on a single device. In the following description, a device on which the first application 10, the character identification program 20, and the recognition program 30 are implemented will be referred to as a "character identification device".

Figure 2:
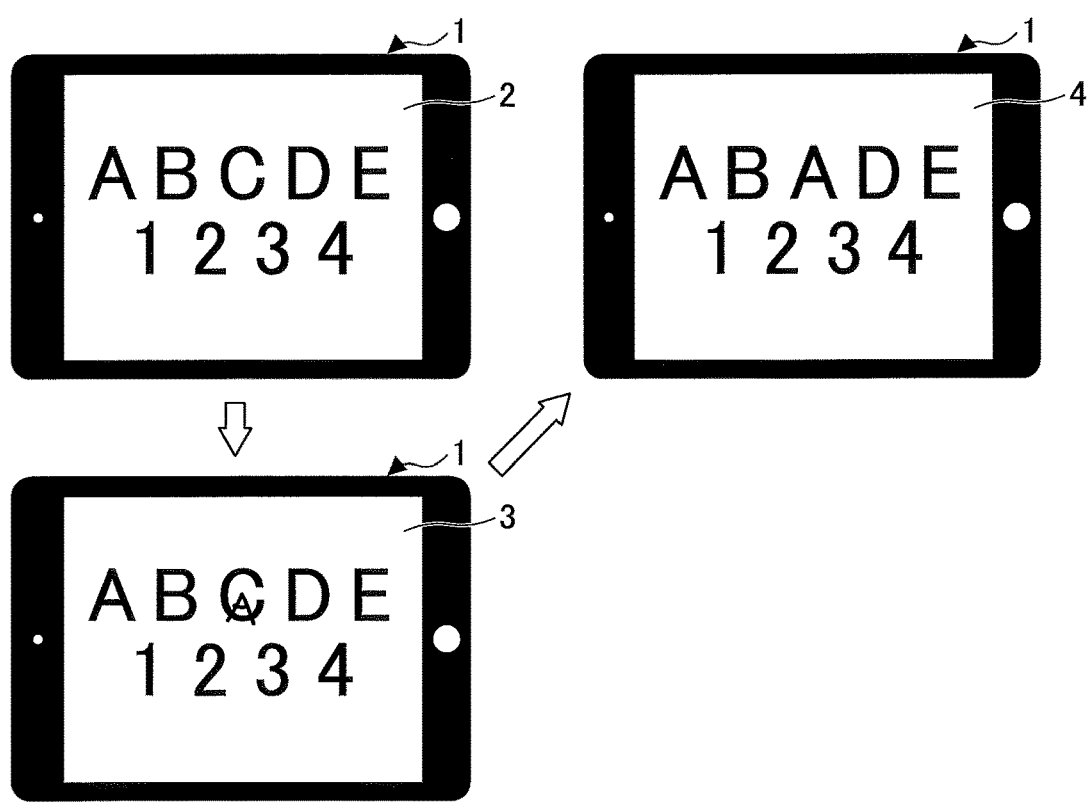
FIG. 2 is a diagram illustrating a handwriting correction input by a character identification device.

Next, the handwriting correction input of a display text in the character identification device in the first embodiment will be described. FIG. 2 is a diagram illustrating a handwriting correction input by the character identification device.

Suppose that a screen 2 is displayed on the character identification device 1. Display texts "ABCDE" and "1234" are displayed on the screen 2. A case will be described in which at this time, a user of the character identification device 1 corrects a character "C" included in the display text to a character "A" by handwriting. Note that the display text on the screen 2 is displayed by the first application 10.

In a correction by handwriting according to the embodiment, as illustrated on a screen 3, the user inputs a character "A" by handwriting directly at the position where the character "C" included in the display text is displayed, through a touch panel or the like of the character identification device 1.

Then, the character identification device 1 causes the character identification program 20 to identify a character group to which the correction has been made by handwriting and the position of the character "C" to be corrected in the character group, from information representing the strokes of the character "A" input by handwriting.

In the example in FIG. 2, the character identification program 20 identifies the display text "ABCDE" as the character group to which the correction has been made. The character identification program 20 also identifies the character "C" in the display text "ABCDE" as the character to be corrected.

Next, the character identification program 20 transfers information representing the strokes of the character "A" to the recognition program 30. The recognition program 30 recognizes the character "A" from the information representing the strokes, and transfers the character group having the correction reflected to the first application 10.

The first application 10 displays the character group having the correction reflected. In the example in FIG. 2, as illustrated on a screen 4, the display text "ABCDE" turns into a display text "ABCDE" in which the character "C" has been corrected to the character "A".

In this way, the character identification device 1 in the first embodiment can directly execute a handwriting correction input to a display text displayed by the first application.

Note that although the handwriting correction input described with FIG. 2 is a correction that replaces the character "C" included in the display text by the character "A", a correction may be made to insert the character "A" before or after the character "C" included in the display text.

Also, in the example in FIG. 2, although the character group (a first character group) among the display texts "ABCDE" and "1234" to be corrected by the handwriting input includes multiple characters, it is not limited as such. The character group to be corrected by a handwriting correction input among display texts displayed by the first application 10 may consist of one character.

Besides, the number of characters to be corrected by a handwriting correction input may be two or more (in other words, replacement or insertion may be made with a character group).

Note that in the handwriting correction input in FIG. 2, the strokes of the character "A" input by handwriting may be displayed in a color different from the color of the display text "ABCDE". For example, if the display text "ABCDE" is displayed in black, the strokes of the character "A" input by handwriting may be displayed in red or blue. Thus, the strokes of the character input by handwriting in the display text can be seen more easily, and it becomes easier for the user to perform a handwriting correction input. In the following, the handwriting correction will be described in detail.

Figure 3:
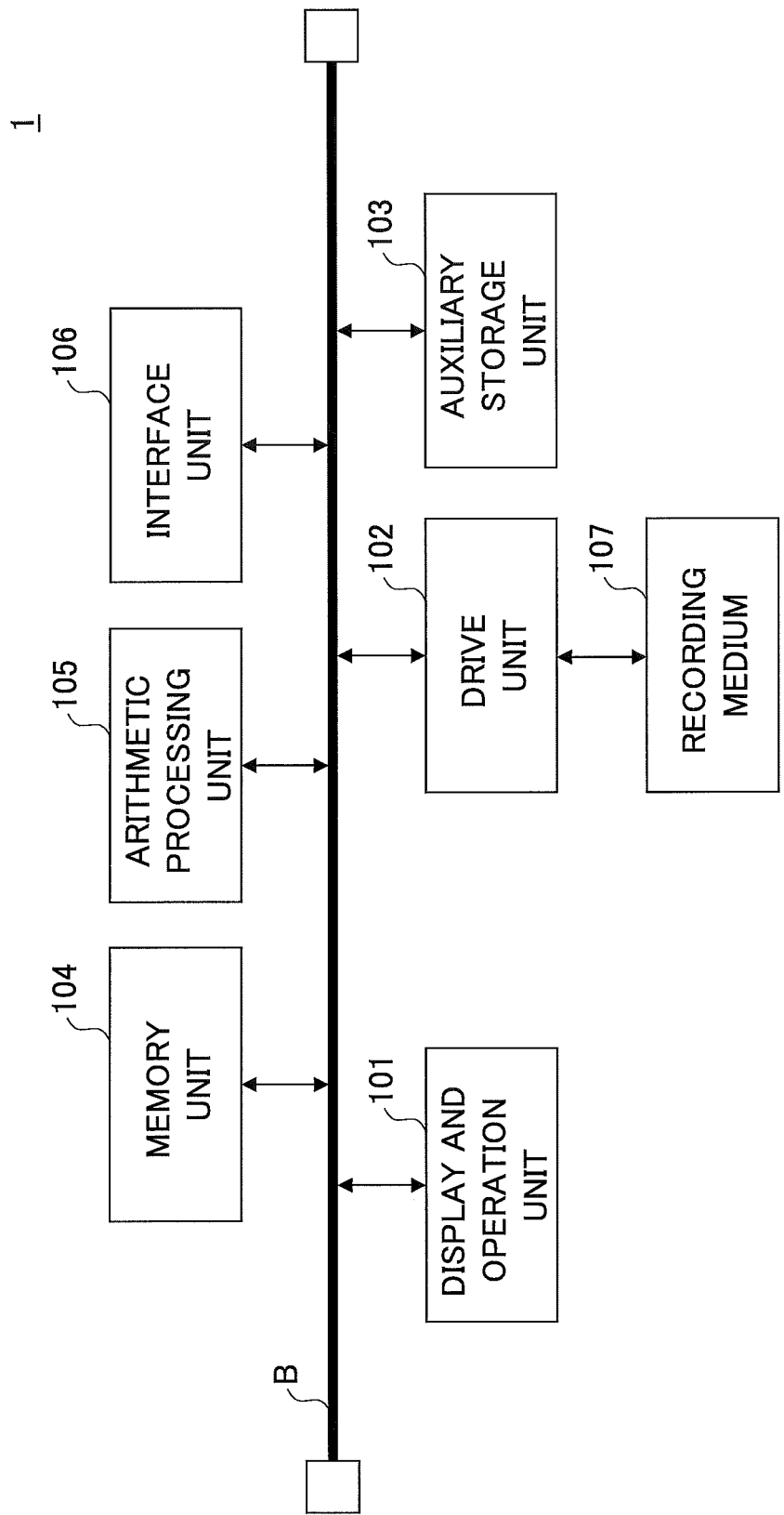
FIG. 3 is a diagram illustrating an example of a hardware configuration of a character identification device.

First, a hardware configuration of the character identification device 1 will be described. FIG. 3 is a diagram illustrating an example of a hardware configuration of the character identification device. The character identification device 1 in the embodiment includes a display operation unit 101, a drive unit 102, an auxiliary storage unit 103, a memory unit 104, an arithmetic processing unit 105, and an interface unit 106, which are mutually connected via a bus B.

The display operation unit 101 is, for example, a touch panel, and is used for inputting various signals, and displaying (outputting) various signals. The interface unit 106 includes a model and a LAN card, and is used for connecting to a network.

The first application 10, the character identification program 20, and the recognition program 30 are at least a part of various programs that control the character identification device 1. These programs are provided, for example, by distributing the recording medium 107, or by downloading from a network. As the recording medium 107 that records the first application 10, the character identification program 20, and the recognition program 30, various types of recording media can be used including recording media that record information optically, electrically or magnetically, such as a CD-ROM, a flexible disk, and an optical magnetic disk, and semiconductor memories that record information electrically such as a ROM and a flash memory.

Also, when the recording medium 107 that records the first application 10, the character identification program 20, and the recognition program 30 is set in the drive unit 102, these programs are installed in the auxiliary storage unit 103 via the drive unit 102 from the recording medium 107. The programs downloaded from a network are installed in the auxiliary storage unit 103 via the interface unit 106.

The auxiliary storage unit 103 stores the first application 10, the character identification program 20, and the recognition program 30 that have been installed, and also stores an OS (Operating System) being base software, required files, data, and the like. The memory unit 104 reads and loads each of the programs when each of the programs is activated. Then, the arithmetic processing unit 105 implements various processes, which will be described later, following the programs stored in the memory unit 104.

Figure 4:
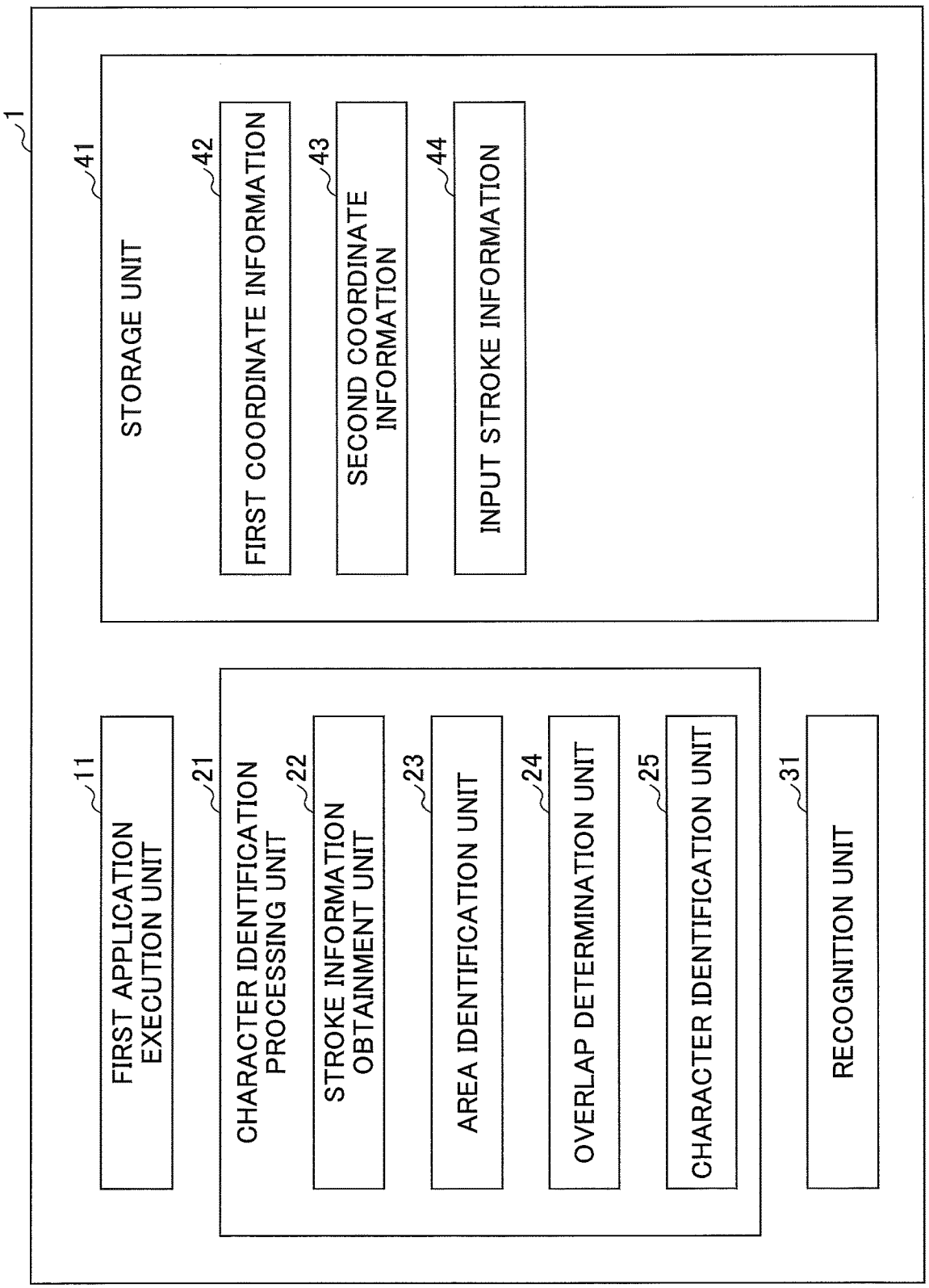
FIG. 4 is a diagram illustrating a functional configuration of a character identification device in the first embodiment.

Next, a functional configuration of the character identification device 1 will be described. FIG. 4 is a diagram illustrating a functional configuration of the character identification device in the first embodiment. The character identification device 1 in the embodiment includes a first application execution unit 11, a character identification processing unit 21, a recognition unit 31, and a storage unit 41.

The first application execution unit 11 in the embodiment is implemented by the arithmetic processing unit 105 executing the first application 10. The character identification processing unit 21 in the embodiment is implemented by the arithmetic processing unit 105 executing the character identification program 20. The recognition unit 31 in the embodiment is implemented by the arithmetic processing unit 105 executing the recognition program 30. The storage unit 41 in the embodiment is implemented by the auxiliary storage unit 103 and the memory unit 104.

The storage unit 41 includes first coordinate information 42, second coordinate information 43, and input stroke information 44.

The first coordinate information 42 is coordinate information that identifies a circumscribing frame of each character included in the display text. Here, the circumscribing frame is a quadrangular frame that circumscribes a character. Therefore, the first coordinate information 42 includes first top coordinate information that identifies the top side, first bottom coordinate information that identifies the base side, first left coordinate information that identifies the left side, and first right coordinate information that identifies the right-hand side of the circumscribing frame.

The second coordinate information 43 is coordinate information that identifies a circumscribing frame of a character formed by strokes input by the user by a handwriting correction input. Similar to the first coordinate information 42, the second coordinate information 43 includes second top coordinate information, second bottom coordinate information, second left coordinate information, and second right coordinate information, which identify the respective sides of the circumscribing frame.

Note that the circumscribing frame is not limited to a quadrangle, and may be a polygon. In this case, the first coordinate information 42 and the second coordinate information 43 includes coordinate information that identifies respective sides of the polygon.

The input stroke information 44 is stroke information input by the user by a handwriting correction input. Note that the stroke information is information representing a single stroke (a trace) done by handwriting that includes two or more coordinate information items. In other words, in the embodiment, a single stroke is identified by connecting coordinates represented by two or more coordinate information items included in the stroke information. Therefore, the recognition unit 31, which will be described later, recognizes a character formed by strokes represented by stroke information.

Here, each coordinate information item included in the first coordinate information 42, the second coordinate information 43, and the input stroke information 44 is represented by X-Y coordinate values relative to the origin, which is, for example, a reference point set in advance on a screen displayed by the character identification device 1. As the reference point, the position of a pixel at the upper left corner on the screen displayed by the character identification device 1 may be set. In this case, for example, the positive direction of the X-axis may be set rightward from the reference point, and the positive direction of the Y-axis may be set downward from the reference point.

The first application execution unit 11 obtains the first coordinate information 42 of a character included in a display text. Also, the first application execution unit 11 replaces a character included in a display text with a character obtained from the recognition unit 31, or inserts a character obtained from the recognition unit 31 into a display text, so as to correct the display text.

Within the extent of a display text displayed by the first application execution unit 11, the character identification processing unit 21 identifies a position and a range at which correction is to be made by handwriting.

The recognition unit 31 recognizes a character from the input stroke information 44, to obtain the character as a recognition result.

In the following, the character identification processing unit 21 will be described in detail. The character identification processing unit 21 in the embodiment includes a stroke information obtainment unit 22, an area identification unit 23, an overlap determination unit 24, and a character identification unit 25.

The stroke information obtainment unit 22 obtains the input stroke information 44 representing strokes input by the user by a handwriting correction input.

The area identification unit 23 obtains the second coordinate information 43 from the input stroke information 44 obtained by the stroke information obtainment unit 22. Also, the area identification unit 23 identifies an area (an input character area) surrounded by a circumscribing frame identified by the second coordinate information 43, and an area (a text area) surrounded by a circumscribing frame identified by the first coordinate information 42. Note that the first coordinate information 42 may be transferred to the area identification unit 23 by the first application execution unit 11. Alternatively, the first coordinate information 42 may be obtained from the storage unit 41 by the area identification unit 23, when the stroke information obtainment unit 22 obtains the input stroke information 44.

For the input character area and the text area identified by the area identification unit 23, the overlap determination unit 24 determines whether the proportion of an area in the input character area overlapping the text area is greater than or equal to a first threshold set in advance.

Depending on the determination result of the overlap determination unit 24, the character identification unit 25 identifies a position and a range in the display text at which the correction is to be made. In other words, the character identification unit 25 identifies a character or a character group in the display text that is, for example, to be replaced. Similarly, the character identification unit 25 identifies a character or a character group in the display text that is, for example, to be inserted.

Figure 5:
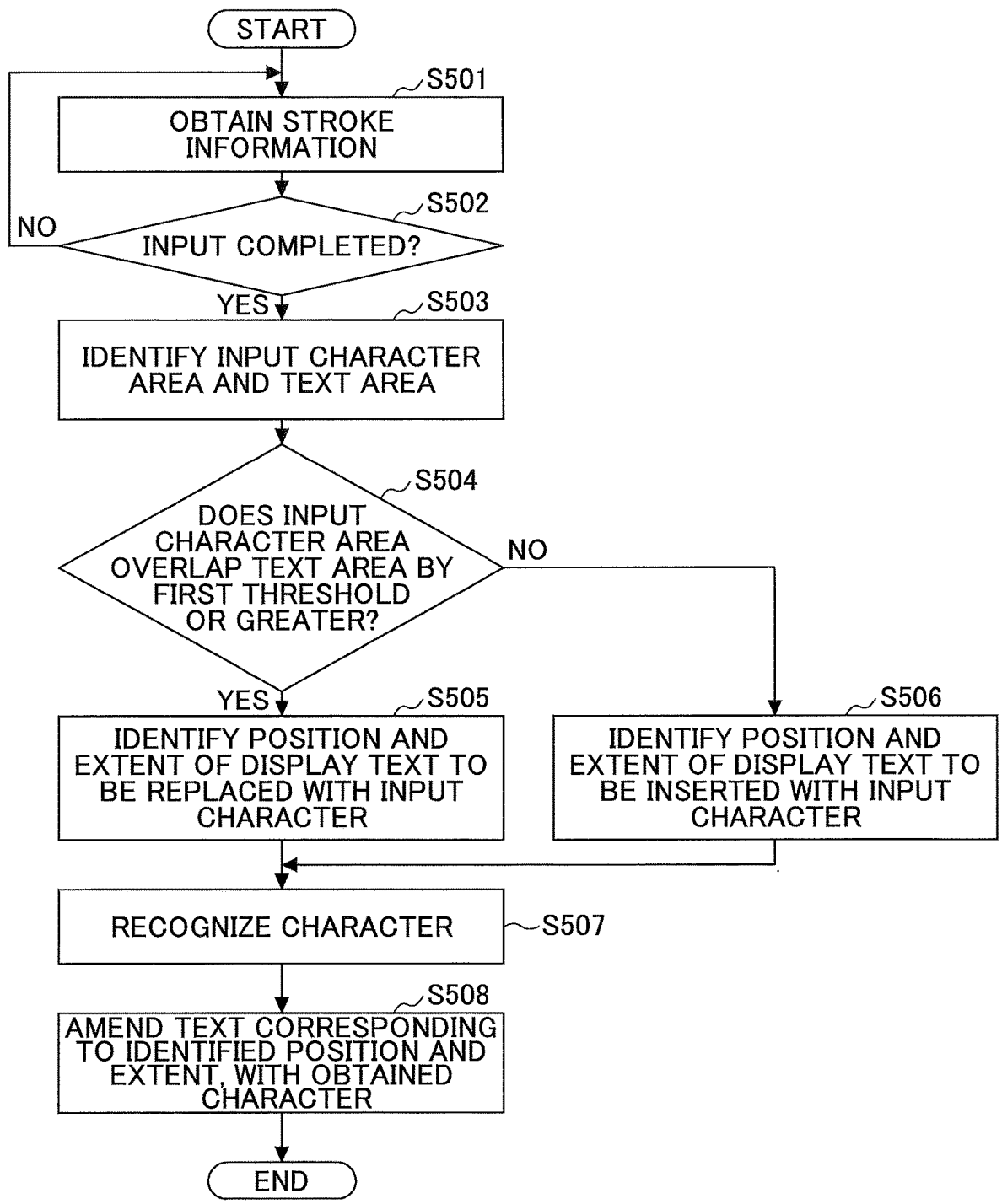
FIG. 5 is a flowchart illustrating an example of a handwriting correction process in the first embodiment.

Next, operations of the character identification device 1 in the embodiment will be described. FIG. 5 is a flowchart illustrating an example of a handwriting correction process in the first embodiment. FIG. 5 illustrates a process that corrects a display text (replacement or insertion of a character) displayed on the display operation unit 101 of the character identification device 1 by a handwriting correction input.

The character identification device 1 in the embodiment causes the stroke information obtainment unit 22 of the character identification processing unit 21 to obtain the input stroke information 44 representing strokes input by the handwriting correction input (Step S501). Next, the character identification device 1 causes the stroke information obtainment unit 22 of the character identification processing unit 21 to determine whether the handwriting correction input has been completed (Step S502). Here, the stroke information obtainment unit 22 may determine that the handwriting correction input has been completed if additional input stroke information 44 is not obtained for a predetermined period of time.

If it has been determined at Step S502 that the handwriting correction input has not been completed, the character identification device 1 returns to Step S501.

If it has been determined at Step S502 that the handwriting correction input has been completed, the character identification device 1 causes the area identification unit 23 of the character identification processing unit 21 to identify a text area and an input character area (Step S503). In other words, the area identification unit 23 obtains the first coordinate information 42 via the first application execution unit 11. Then, the area identification unit 23 identifies a text area based on the first coordinate information 42. The area identification unit 23 also obtains the second coordinate information 43 from the input stroke information 44. Then, the area identification unit 23 identifies an input character area based on the second coordinate information 43. Note that according to the embodiment, identifying a text area by the area identification unit 23 identifies a character group to which a correction is to be made.

Next, the character identification device 1 causes the overlap determination unit 24 of the character identification processing unit 21 to determine whether the proportion of an area in the input character area overlapping the text area is greater than or equal to the first threshold (Step S504). Note that the first threshold may be set, for example, to one-half. In this case, the overlap determination unit 24 determines whether the input character area overlaps the text area by one-half or more.

If it has been determined at Step 504 that the proportion of an area in the input character area overlapping the text area is greater than or equal to the first threshold, the character identification device 1 causes the character identification unit 25 of the character identification processing unit 21 to identify a character or a character group to be replaced in the display text (Step S505). In other words, the character identification unit 25 identifies a position and a range in the display text to be replaced by a character input by the handwriting correction input.

If it has been determined at Step 504 that the proportion of an area in the input character area overlapping the text area is not greater than or equal to the first threshold, the character identification device 1 causes the character identification unit 25 of the character identification processing unit 21 to identify a character or a character group to be inserted in the display text (Step S506). In other words, the character identification unit 25 identifies a position and a range in the display text to be inserted with a character input by the handwriting correction input.

Next, the character identification device 1 causes the recognition unit 31 to recognize a character corresponding to the input stroke information 44 obtained by the stroke information obtainment unit 22, to obtain the character as a recognition result (Step S507). Then, the recognition unit 31 transfers the obtained character to the first application execution unit 11. Note that if the input stroke information 44 obtained by the stroke information obtainment unit 22 corresponds to multiple characters, the recognition unit 31 obtains the multiple characters (namely, a character group).

Finally, depending on the determination result at Step S504, the character identification device 1 causes the first application execution unit 11 to correct the display text at the position and the range identified at Step S505 or Step S506, by the character or the character group obtained at Step S507 (Step S508).

In other words, if having proceeded from Step S504 to Step S505, the first application execution unit 11 replaces the character or the character group at the position and the range identified in the display text, by the obtained character or character group. Alternatively, if having proceeded from Step S504 to Step S506, the first application execution unit 11 inserts the character or the character group at the position and the range identified in the display text, by the obtained character or character group. This concludes a series of steps for a handwriting correction in the embodiment.

Figure 6:
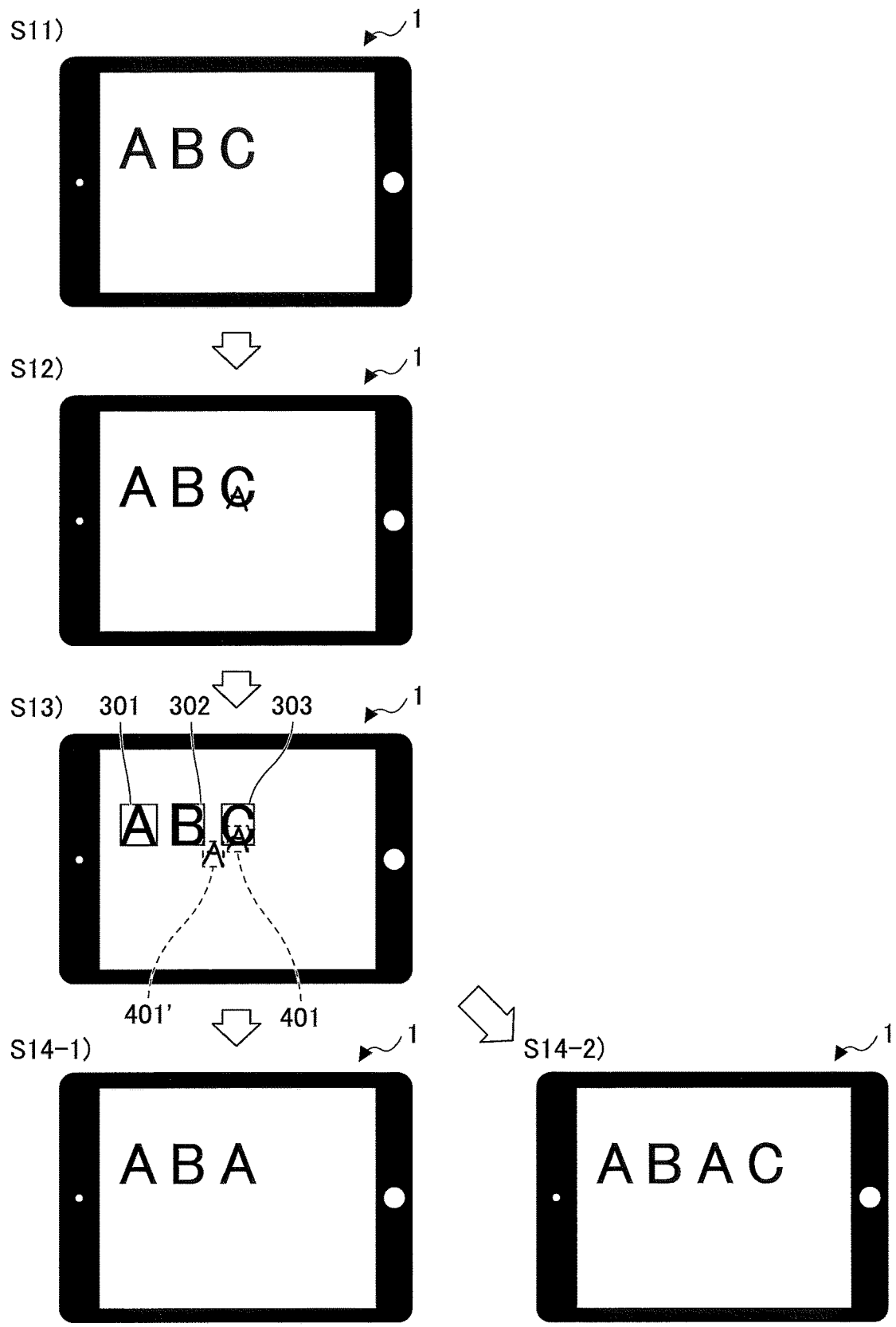
FIG. 6 is a diagram illustrating a specific example of a handwriting correction in the first embodiment.

Next, with reference to FIG. 6, a case will be described specifically in which a handwriting correction is executed by the handwriting correction process described with FIG. 5. FIG. 6 is a diagram illustrating a specific example of a handwriting correction in the first embodiment.

First, suppose that a display text "ABC" is displayed on the character identification device 1 (State S11).

In State S11, the character identification device 1 receives a handwriting correction that has been performed by the user for correcting a character "C" to a character "A" in the display text (State S12). Then, the stroke information obtainment unit 22 obtains the input stroke information 44 representing strokes input by the handwriting correction input. In the example in FIG. 6, the stroke information obtainment unit 22 obtains input stroke information $44_1$ of the first stroke of the character "A", input stroke information $44_2$ of the second stroke of the character "A", and input stroke information $44_3$ of the third stroke of the character "A".

Next, the area identification unit 23 identifies a text area and an input character area. Then, the overlap determination unit 24 determines whether the input character area overlaps the text area by the first threshold or greater (State S13).

Specifically, the area identification unit 23 identifies a text area and an input character area as follows. First, the area identification unit 23 obtains coordinate information of each character of the display text "ABC", which is maintained by an OS, via the first application execution unit 11. Then, the first coordinate information 42 is obtained for each character, including, for example, coordinate information having the minimum Y-coordinate as first top coordinate information; coordinate information having the maximum Y-coordinate as first bottom coordinate information; coordinate information having the minimum X-coordinate as first left coordinate information; and coordinate information having the maximum X-coordinate as first right coordinate information.

Next, the area identification unit 23 in the embodiment identifies a text area of each character included in the display text from the first coordinate information 42 of each character.

In the example in FIG. 6, based on the first coordinate information 42 of each character, the area identification unit 23 identifies a text area 301 of the character "A" in the display text, a text area 302 of the character "B" in the display text, and a text area 303 of the character "C" in the display text. In the embodiment, once the text area of each character has been identified, information related to the display position and size of each character in the display text is identified.

The area identification unit 23 also obtains the second coordinate information 43 of the character "A" input by handwriting from the input stroke information $44_1$, the input stroke information $44_2$, and the input stroke information $44_3$. Specifically, among the coordinate information included in the input stroke information $44_1$, the input stroke information $44_2$, and the input stroke information $44_3$, the area identification unit 23 obtains the second coordinate information 43 including, for example, coordinate information having the minimum Y-coordinate as second top coordinate information; coordinate information having the maximum Y-coordinate as second bottom coordinate information; coordinate information having the minimum X-coordinate as second left coordinate information; and coordinate information having the maximum X-coordinate as second right coordinate information.

Next, based on the second coordinate information 43, the area identification unit 23 identifies the input character area 401 of the character "A" input by the handwriting correction input.

Next, the overlap determination unit 24 determines whether the input character area 401 overlaps each of the text area 301, the text area 302, and the text area 302 by the first threshold or more. Then, depending on the determination result by the overlap determination unit 24, the character identification unit 25 identifies the position and the range at which the correction is to be made. A correction in the embodiment is replacement or insertion of a character.

First, replacement of a character will be described. In State S13 in FIG. 6, the input character area 401 overlaps the text area 303. Besides, in State S13 in FIG. 6, the proportion of the area in the input character area 401 that overlaps the text area 303 is one-half or more. Therefore, the overlap determination unit 24 determines that the input character area 401 overlaps the text area 303 by the first threshold or more.

From this determination result, the character identification unit 25 identifies the character "C" in the text area 303 as the replacement target (correction target) to be replaced with the character input for the correction.

In the display text, once the character to be replaced has been identified, the first application execution unit 11 replaces the character "C" corresponding to the text area 303 with the character "A" corresponding to the strokes input by the handwriting correction input (State S14-1).

Next, insertion of a character will be described. In State S13 in FIG. 6, suppose that the input character area identified by the area identification unit 23 is an input character area 401'. In this case, the input character area 401' partially overlaps both the text area 302 and the text area 303.

However, in the input character area 401', the ratios of the areas that overlap the text area 302 and the text area 303, respectively, are both smaller than one-half.

Therefore, the overlap determination unit 24 determines that the input character area 401' does not overlap the text area 302 and the text area 303 by the first threshold or more. Also, the character identification unit 25 identifies a position between the text area 302 and the text area 303 as the insertion point of the character "C" input for the correction.

In the display text, once the insertion point of the correction character has been identified, the first application execution unit 11 inserts the character "A" corresponding to the strokes input by the handwriting correction input, between the text area 302 and the text area 303 (State S14-2).

In this way, by using the character identification device 1 in the embodiment, it is possible to perform a handwriting correction input for a display text displayed by the first application 10, without specifying a position and a range with a cursor or the like, at which the correction is to be made.

Here, in a display text displayed on the display operation unit 101 of the character identification device 1, characters other than the character or the character group to be corrected by a handwriting correction are not to be corrected; rather, the displayed characters are protected.

In the following, with reference to FIG. 7, protection of a display text will be described. FIG. 7 is a diagram illustrating protection of a display text. FIG. 7 illustrates a case in which characters are to be inserted by a handwriting correction in a display text where the number of characters is limited.

In FIG. 7, the display text displayed by the first application execution unit 11 is displayed in a display field 61, and the number of characters that can be displayed in the display field 61 is five.

In this case, for example, upon receiving a character group "AAA" (a first character group) as input by a handwriting correction on the character "C", the first application execution unit 11 may display a message 72 or the like indicating that, for example, the number of characters exceeds a predetermined number of characters, without replacing the character "C" by the character group "AAA".

This makes it possible to avoid erasing a character group "DE" (a second character group) that has been input before the correction, which would be erased by replacing the character "C" with the character group "AAA" in the display field 61, against the intention of the user who had performed the handwriting correction. Thus, according to the embodiment, characters other than those to be corrected in a display text are not affected by a handwriting correction input, and characters not located at the position and range identified by the handwriting correction input are protected.

In addition, although the example in FIG. 7 has been described for the case in which the number of characters in the display text of the display field 61 is limited, it is not limited as such. In the embodiment, for example, if a handwriting correction has been input in a display text, the first application execution unit 11 may inhibit receiving a correction for a character not overlapping the input strokes until the completion of the preceding correction completes.

Also, in the example in FIG. 7, although the characters other than those to be corrected are protected by a process of the first application execution unit 11, this process may be executed by the character identification processing unit 21. In this case, the character identification processing unit 21 in the embodiment just needs to obtain information required for protection in advance, including the number of characters in a display text, and the number of characters that can be displayed in a display field, from the first application execution unit 11.

Besides, the character identification device 1 in the embodiment executes a handwriting correction directly on a display text. Therefore, display texts other than the text to be corrected are not hidden by, for example, the input field for the handwriting input. Therefore, the character identification device 1 in the embodiment enables the user to perform a handwriting correction, while referring to display texts other than the text to be corrected.

Figure 8:
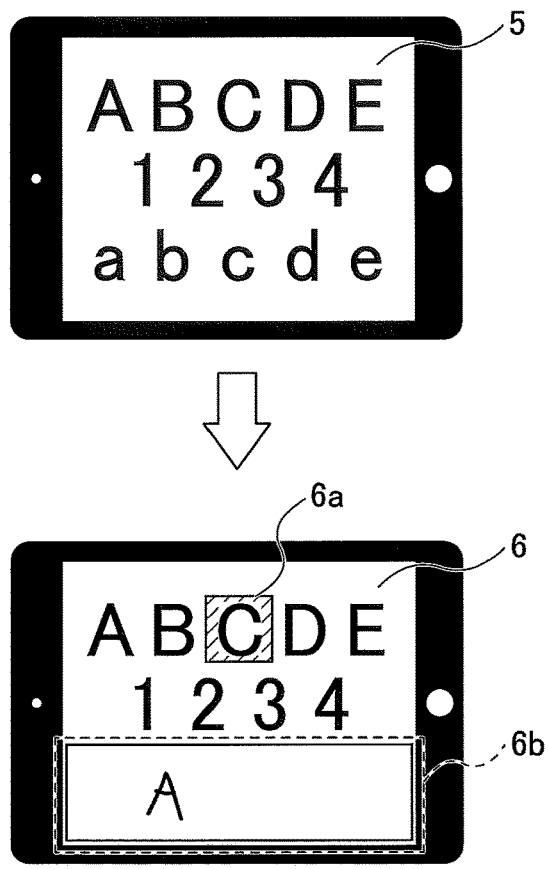
FIG. 8 is a diagram illustrating a handwriting correction with which an input field is displayed.

In the following, with reference to FIG. 8, comparison with a handwriting input with which an input field is displayed will be described. FIG. 8 is a diagram illustrating a handwriting correction with which an input field is displayed. FIG. 8 illustrates a case in which the input field into which the user inputs strokes is displayed when the user corrects a character by a handwriting correction.

In FIG. 8, suppose that display texts "ABCDE", "12345", and "abcde" are displayed on a screen 5. On the screen 5, in order to correct a character "C" to a character "A" by a handwriting correction, the user specifies the correction target and the range 6*a* with a cursor or the like as illustrated on a screen 6, and then, a handwriting input field 6*b* for performing the handwriting correction is displayed.

Therefore, the display text "abcde" is hidden by the handwriting input field 6*b*, and when the user inputs a character by handwriting in the handwriting input field 6*b*, the user cannot refer to the display text "abcde". This is inconvenient if the user wants to make the correction while referring to display texts other than the display text to be corrected. For example, when the user is going to correct the character "C" to the character "A", if the user wants to confirm the character color of a character "c", the hidden character "c" cannot be referred to; therefore, the user needs to make the input field 6b non-displayed once, so as to confirm the character color, which is inconvenient.

In contrast to this, the character identification device 1 in the embodiment enables the user to perform a correction by handwriting, which is directly input on a display text, and does not need to display an input field. Therefore, according to the embodiment, when performing a correction by handwriting directly input on a display text, it is possible to perform the correction while referring to characters before and after the correction target, the context, and the like.

Furthermore, the character identification device 1 in the embodiment enables the user to perform a correction by handwriting while referring to a display text displayed by another application.

Figure 9:
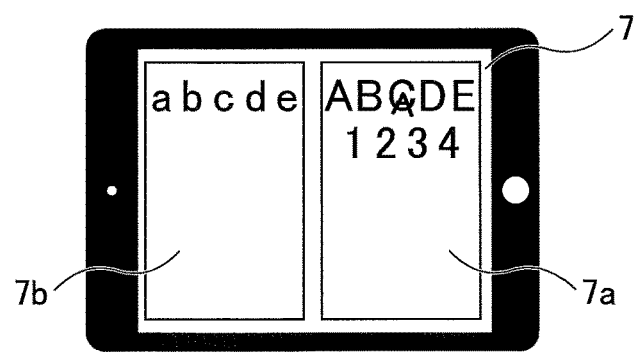
FIG. 9 is a diagram illustrating display texts of multiple applications.

FIG. 9 is a diagram illustrating display texts of multiple applications. In the following, with reference to FIG. 9, a case will be described in which a handwriting correction is performed while referring to a display text displayed by another application.

On a screen 7 illustrated in FIG. 9, an application screen 7a displayed by the first application 10, and an application screen 7b displayed by a second application are displayed.

The screen 7 is displayed on the display operation unit 101, for example, if a display text on the application screen 7a is to be corrected while referring to the content of a display text on the application screen 7b.

Specifically, a case may be considered, for example, where a word with correct spelling is displayed on the application screen 7b, and the user refers to the application screen 7b, and is going to correct the spelling of a word that is a display text on the application screen 7a.

The character identification device 1 in the embodiment enables the user, if a character "C" in the display text displayed on the application screen 7a is to be corrected to a character "A" by a handwriting correction, to perform the correction while referring to a display text "abcde" being displayed on the application screen 7b. In other words, the user can perform a correction while referring to a display text other than the display text to be corrected.

Second Embodiment

Next, a second embodiment will be described. In the following description of the second embodiment, different points from the first embodiment will be described, whereas elements having the same functional configurations as in the first embodiment are assigned the same reference symbols, and description is omitted for such elements.

A character identification device 1A in the embodiment can delete a character in a display text by a handwriting correction input.

Figure 10:
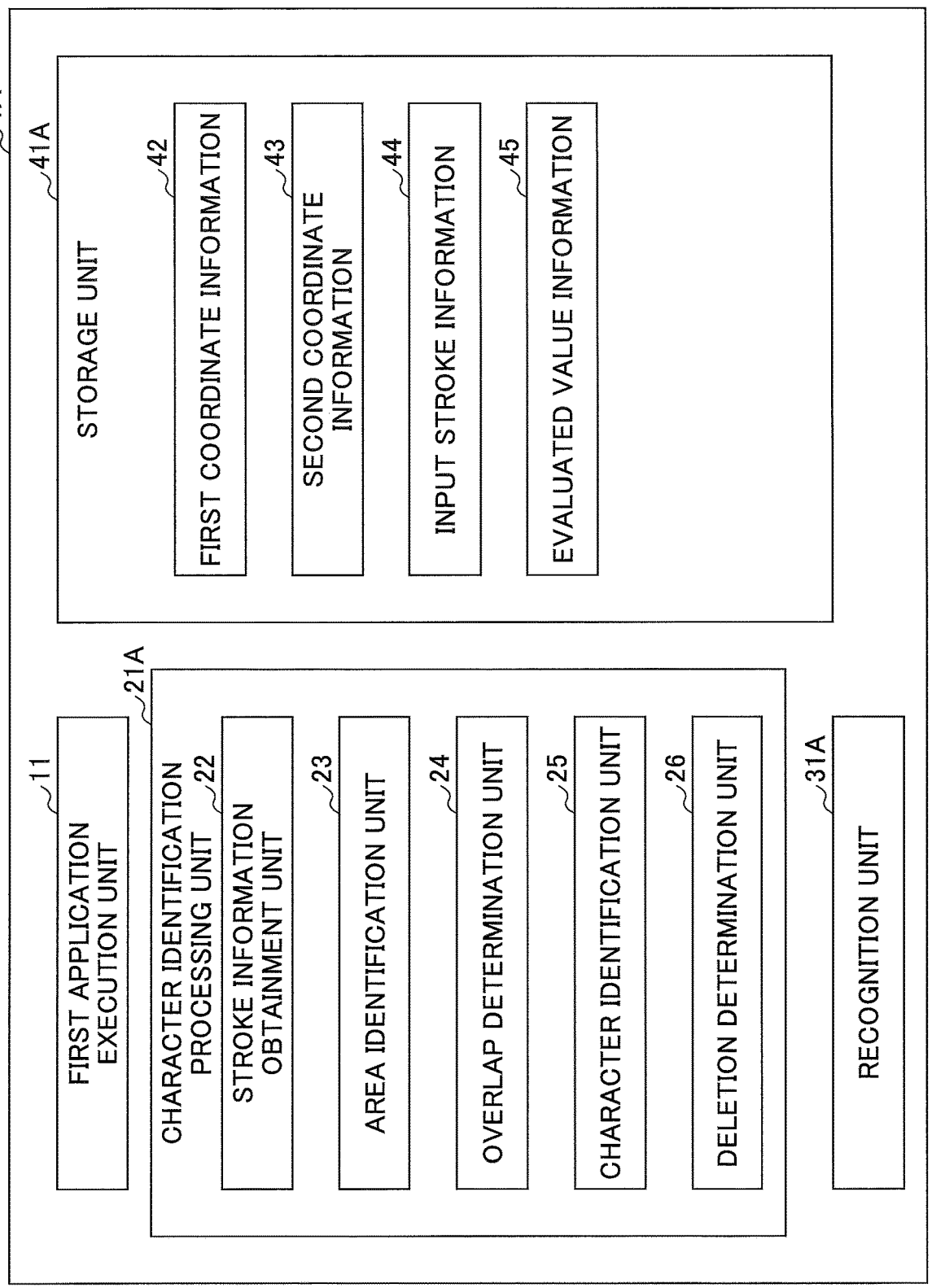
FIG. 10 is a diagram illustrating a functional configuration of a character identification device in a second embodiment.

FIG. 10 is a diagram illustrating a functional configuration of the character identification device in the second embodiment. The character identification device 1A in the embodiment includes a character identification processing unit 21A, a recognition unit 31A, and a storage unit 41A. In addition, the character identification processing unit 21A in the embodiment includes a deletion determination unit 26. Furthermore, the storage unit 41A in the embodiment includes an evaluated value information 45.

The recognition unit 31A obtains evaluated value information 45 as a recognition result, which includes a character recognized from input stroke information 44 as a recognition result, and an evaluated value of the character.

The evaluated value information 45 is information obtained by the recognition unit 31A as a recognition result, and is information that includes a character recognized from input stroke information 44, and an evaluated value of the character. Here, the evaluated value is a value that represents the certainty of a character recognized from the input stroke information 44. Note that the evaluated value information 45 may include multiple characters and the evaluated values of the characters.

Based on a determination result by the overlap determination unit 24 and the evaluated value information 45, the deletion determination unit 26 determines whether the handwriting correction input is for deletion of a character in a display text. Specifically, the deletion determination unit 26 determines that the correction is deletion of a character if the proportion of an area in the input character area overlapping the text area is greater than or equal to the first threshold, and if the evaluated value of the character indicating deletion in the evaluated value information 45 is greater than or equal to a second threshold set in advance. Here, "the character indicating deletion" is a deletion mark, which may be denoted as, for example, "-".

Figure 11:
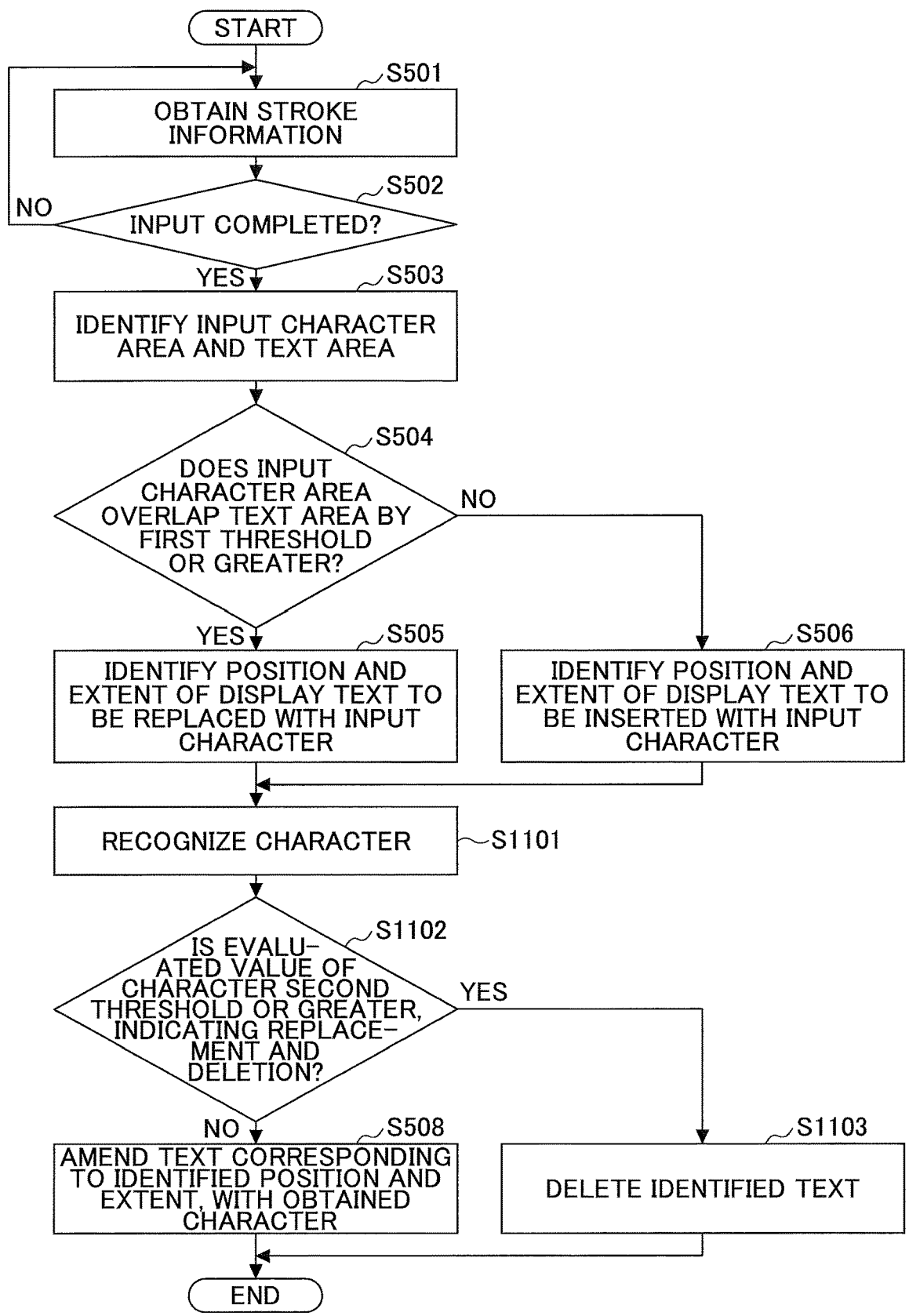
FIG. 11 is a flowchart illustrating an example of a handwriting correction process in the second embodiment.

Next, operations of the character identification device 1A in the embodiment will be described. FIG. 11 is a flowchart illustrating an example of a handwriting correction process in the second embodiment. With reference to FIG. 11, a process of deleting a display text being displayed on the display operation unit 101 of the character identification device 1A by a handwriting correction input, will be mainly described. Note that replacement or insertion of a character can be done as has been described in the first embodiment with reference to FIG. 5, and the description is omitted here.

The character identification device 1A in the embodiment causes the recognition unit 31A to recognize a character corresponding to the input stroke information 44 obtained by the stroke information obtainment unit 22, to obtain the evaluated value information 45 as a recognition result (Step S1101).

Next, the character identification device 1A in the embodiment causes the deletion determination unit 26 of the character identification processing unit 21A to determine whether the handwriting correction input is for deletion of a character in a display text, based on a determination result by the overlap determination unit 24 and the evaluated value information 45 (Step S1102). Specifically, the deletion determination unit 26 determines whether the proportion of an area in the input character area overlapping the text area is greater than or equal to the first threshold (namely, the correction target is to be replaced), and the evaluated value of the character indicating deletion included in the evaluated value information 45 is greater than or equal to the second threshold.

If it has been determined at Step S1102 that the correction target is to be replaced, and the evaluated value of the character indicating deletion included in the evaluated value information 45 is greater than or equal to the second threshold, the character identification device 1A causes the first application execution unit 11 to delete the correction target in the display text with a character or a character group in the range (Step S1103). This concludes a series of steps for a handwriting correction in the embodiment.

Figure 12:
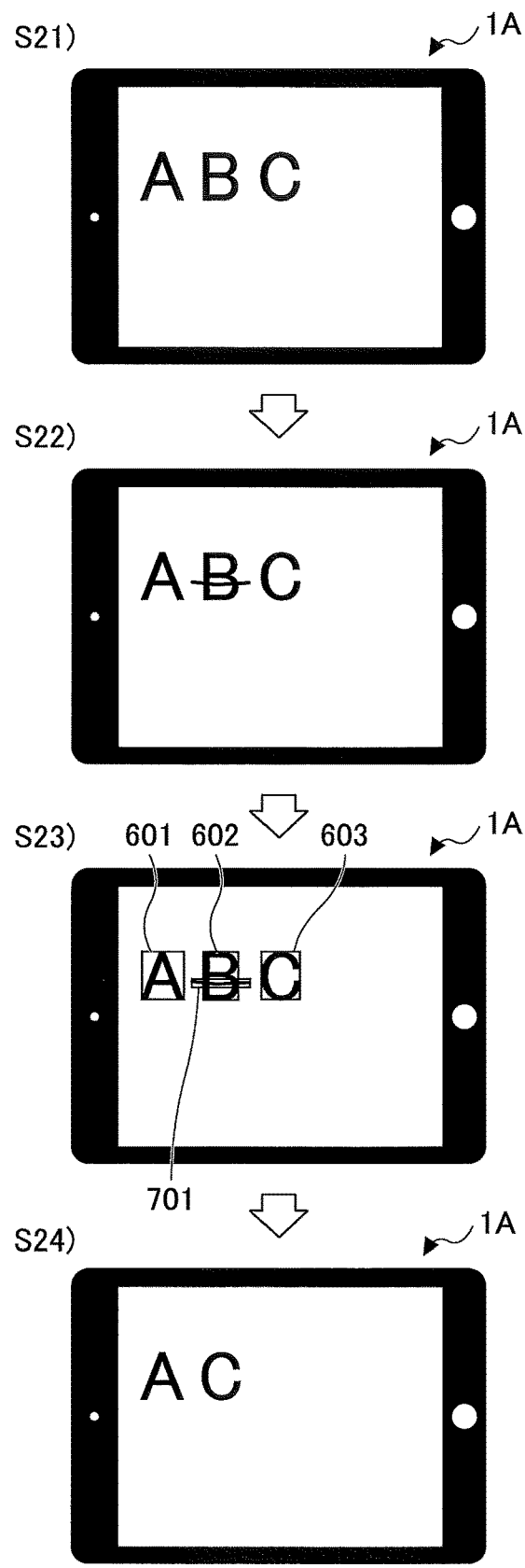
FIG. 12 is a diagram illustrating a specific example of character deletion according to a handwriting correction process in the second embodiment.

Next, with reference to FIG. 12, a case will be specifically described in which a handwriting correction for deleting a character is executed by the handwriting correction process described with FIG. 11. FIG. 12 is a diagram illustrating a specific example of character deletion according to the handwriting correction process in the second embodiment.

FIG. 12 illustrates a case in which, in a state (State S21) where a display text "ABC" is displayed on the display operation unit 101 of the character identification device 1A, the user performs a correction by a handwriting input for deleting a character "B" in the display text.

In State S21, in response to receiving as input a character "-" indicating deletion of the character "B", the character identification device 1A causes the stroke information obtainment unit 22 to obtain the input stroke information 44 representing strokes input by the handwriting input (State S22). In the example in FIG. 12, the stroke information obtainment unit 22 obtains the input stroke information 44 of the character "-" indicating deletion.

Next, the area identification unit 23 identifies a text area and an input character area. Then, the overlap determination unit 24 determines whether the proportion of an area in the input character area overlapping the text area is greater than or equal to the first threshold (State S23).

In State S23 in FIG. 12, the input character area 701 overlaps the text area 602 among the text areas 601, 602, and 603. Besides, in State S23 in FIG. 12, the proportion of the area in the input character area 701 overlapping the text area 602 is one-half or more. Therefore, the overlap determination unit 24 determines that the input character area 701 overlaps the text area 602 by the first threshold or more.

The deletion determination unit 26 also determines whether the evaluated value of the character indicating deletion included in the evaluated value information 45 is greater than or equal to the second threshold. For example, suppose that the evaluated value information 45 includes a character "□-" (a Chinese character representing "one") and its evaluated value "50"; a character "-" (hyphen) and its evaluated value "40"; and a character "-" indicating deletion and its evaluated value "35", and the second threshold is "30". In this case, the deletion determination unit 26 determines that the evaluated value of the character indicating deletion included in the evaluated value information 45 is greater than or equal to the second threshold.

From this determination result, the first application execution unit 11 determines that the character "-" indicating deletion is for deleting the character "B", and deletes the character "B" in the text area 602 that is located at the position and the range identified by the character identification unit 25 (State S24).

In this way, by using the character identification device 1 in the embodiment, it is possible to perform deletion of a character in a display text displayed by the first application 10, without specifying a position and a range at which a correction is to be made with a cursor or the like.

Third Embodiment

Next, a third embodiment will be described. In the following description of the third embodiment, different points from the first embodiment will be described, whereas elements having the same functional configurations as in the first embodiment are assigned the same reference symbols, and description is omitted for such elements.

Figure 13:
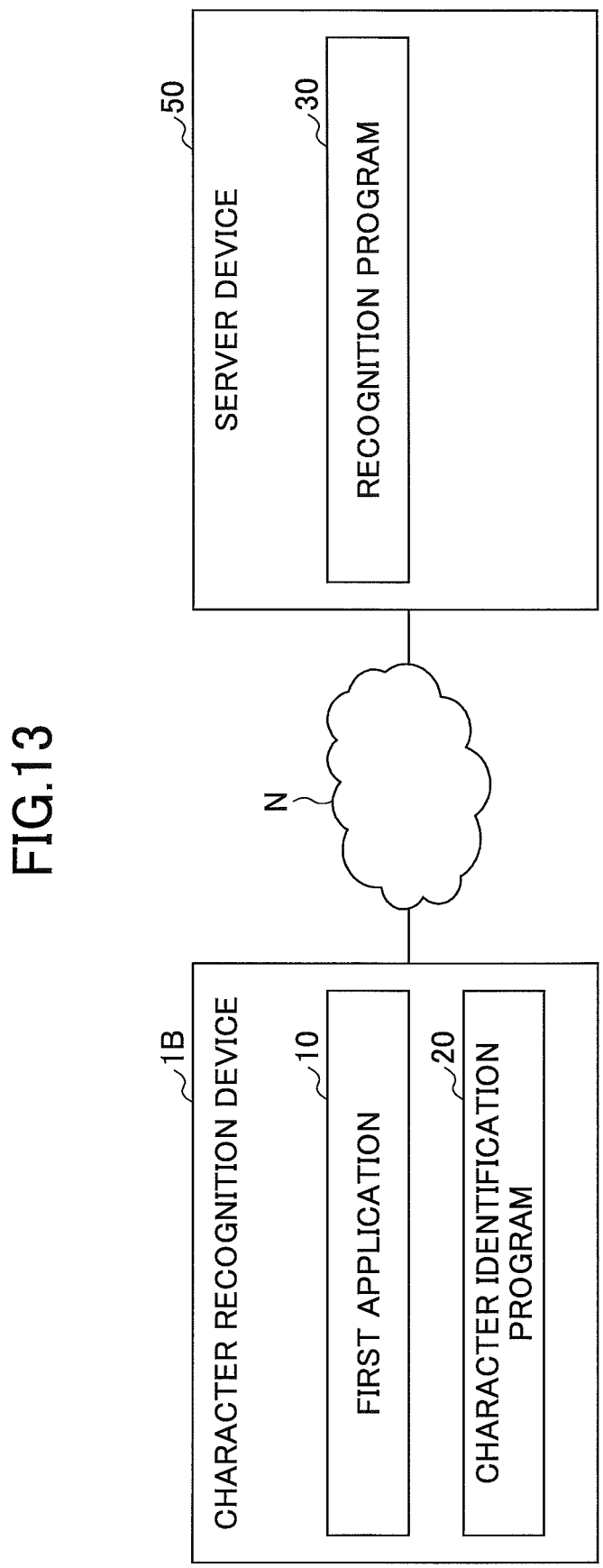
FIG. 13 is a diagram illustrating an example of a character identification system in a third embodiment.

In the embodiment, a case will be described in which the recognition program 30 is installed in a device that is different from the character identification device 1. FIG. 13 is a diagram illustrating an example of a character identification system in the third embodiment.

A character identification device 1B in the embodiment includes a first application 10 and a character identification program 20. Besides, a server device 50 connected with the character identification device 1B via a network N includes a recognition program 30.

In the embodiment, the character identification device 1B causes the character identification program 20 to transmit input stroke information 44 representing strokes input as a handwriting correction input, to the server device 50. Then, the server device 50 causes the recognition program 30 to recognize a character in the input stroke information 44, and replies with the recognition result sent to the character identification device 1B.

Besides, the character identification device 1B causes the character identification program 20 to identify a correction target and the range in a display text. Then, the character identification device 1B causes the first application 10 to correct the display text by a character or a character group replied from the server device 50 as the recognition result.

Such a configuration makes it possible, for example, to manage information used by the recognition program 30 for character recognition in the server device 50. Therefore, if a database or the like to which the recognition program 30 refers is updated in the server device 50, and the precision of character recognition by the recognition program 30 is improved, this will also benefit recognition of strokes input as a handwriting correction.

Fourth Embodiment

Next, a fourth embodiment will be described. In the following description of the fourth embodiment, different points from the first embodiment will be described, whereas elements having the same functional configurations as in the first embodiment are assigned the same reference symbols, and description is omitted for such elements.

Figure 14:
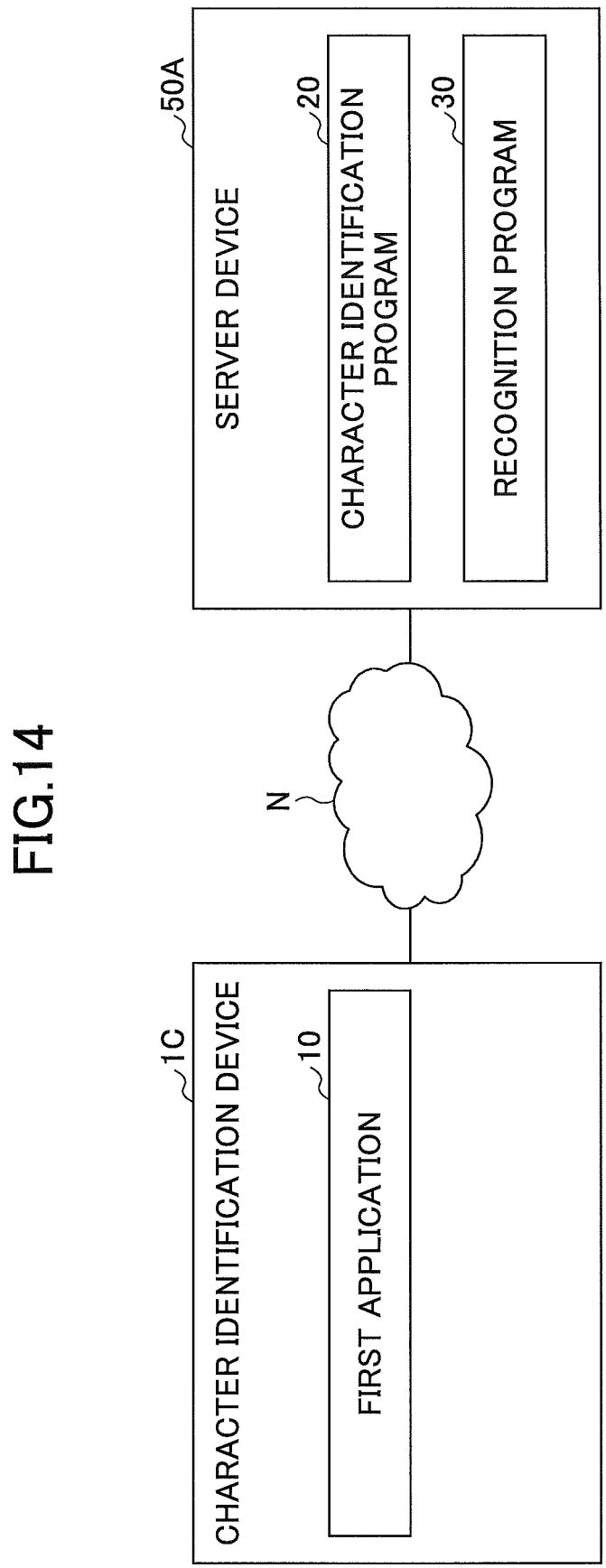
FIG. 14 is a diagram illustrating an example of a character identification system in a fourth embodiment.

In the embodiment, a case will be described in which the character identification program 20 and the recognition program 30 are installed in a device that is different from the character identification device 1. FIG. 14 is a diagram illustrating an example of a character identification system in the fourth embodiment.

A character identification device 1C in the embodiment includes a first application 10. Besides, a server device 50A connected with the character identification device 1C via a network N includes a character identification program 20 and a recognition program 30.

In the embodiment, the character identification device 1C causes the first application 10 to transmit stroke information input by the user and the coordinate information of each character in a display text, to the server device 50A. The server device 50A causes the character identification program 20 to obtain the input stroke information 44 and the coordinate information of each character in the display text, to identify a correction target and a range. Besides, the server device 50A recognizes a character from the input stroke information 44, and obtains the character as a recognition result.

Next, the server device 50A replies with identified correction target and range, and a character or a character group obtained as a recognition result, sent to the character identification device 1C.

Then, the character identification device 1 causes the first application 10 to correct the display text based on the replied correction target and range, and the character or the character group obtained as the recognition result.

Such a configuration enables the character identification device 1C, if having the first application 10 installed, to execute a handwriting correction described in the first embodiment and the second embodiment.

As above, the embodiments of the present invention have been described in detail. Note that the present invention is not limited to such specific embodiments, but various variations and modifications may be made within the scope of the subject matters of the present invention described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input processing method executed by a computer, the method comprising:
    receiving a handwriting input to a display area on a display screen of a touch panel on which a character string is displayed in the display area;
    in response to a determination that a proportion of an area in an input character area, identified based on strokes of the handwriting input, overlapping a text area of a specific character in the character string displayed in the display area is greater than or equal to a predetermined first threshold,
    recognizing a character corresponding to the strokes of the handwriting input in the input character area to obtain the character recognized and an evaluation value of the character recognized, wherein the evaluation value is a value that represents a certainty of a character recognized from the strokes of the handwriting input;
    determining whether the proportion of the area in the input character area overlapping the text area of the specific character in the character string displayed in the display area is greater than or equal to the predetermined first threshold and the evaluation value of a character recognized as indicating deletion of the specific character in the text area is greater than or equal to a predetermined second threshold; and
    in response to a determination that the proportion of the area in the input character area overlapping the text area of the specific character in the character string displayed in the display area is greater than or equal to the predetermined first threshold and the evaluation value of the character recognized as indicating deletion of the specific character in the text area is greater than or equal to the predetermined second threshold,
    executing a process of deleting the specific character in the text area from the character string displayed in the display area.

2. The input processing method as claimed in claim 1, wherein the strokes of the handwriting input are displayed in red, blue, or a display color different from a display color of the specific character.

3. The input processing method as claimed in claim 1, wherein the handwriting input is input by a stylus.

4. The input processing method as claimed in claim 1, the method further comprising:
    obtaining display information related to a display position and a size of each character in a text displayed by a first application; and
    in response to a handwriting correction input with respect to a display of a first character group included in the display text of the first application, identifying the first character group based on the display information and a position of the handwriting correction input.

5. The input processing method as claimed in claim 4, the method further comprising:
    reflecting a result obtained by applying a recognition result of the handwriting correction input to the first character group, in the display text of the first application.

6. The input processing method as claimed in claim 5, wherein the reflecting protects a second character group other than the first character group in the display text.

7. The input processing method as claimed in claim 6, wherein the reflecting is one of a process of replacing the first character group with a character input by the handwriting correction input; a process of inserting the character input by the handwriting correction input into the first character group; and a process of deleting a character on which the handwriting correction input has been performed, from the first character group.

8. The input processing method as claimed in claim 4, wherein the first character group is a text recognized with respect to the handwriting input.

9. The input processing method as claimed in claim 4, wherein the first character group is a text generated by an input method other than the handwriting input.

10. The input processing method as claimed in claim 4, wherein the first character group consists of one character.

11. The input processing method as claimed in claim 4, wherein the first character group includes a plurality of characters.

12. The input processing method as claimed in claim 4, wherein the display text of the first application is displayed on a same screen as a display text displayed by a second application.

13. An input processing method executed by a computer, the method comprising:
    receiving a handwriting input to a display area on a display screen of a touch panel on which a character string is displayed in the display area;
    in response to a determination that a proportion of an area in an input character area, identified based on strokes of the handwriting input, overlapping a text area of a specific character in the character string displayed in the display area is greater than or equal to a predetermined first threshold,
    executing a process of identifying an input position of a character recognized with respect to the strokes of the handwriting input as a position of the specific character in the display area;
    recognizing the character corresponding to the strokes of the handwriting input in the input character area to obtain the character recognized and an evaluation value of the character recognized, wherein the evaluation value is a value that represents a certainty of a character recognized from the strokes of the handwriting input;
    determining whether the proportion of the area in the input character area overlapping the text area of the specific character in the character string displayed in the display area is greater than or equal to the predetermined first threshold and the evaluation value of a
character recognized as indicating deletion of the specific character in the text area is greater than or equal
to a predetermined second threshold; and in response to a determination that the proportion of the
area in the input character area overlapping the text
area of the specific character in the character string
displayed in the display area is greater than or equal to
the predetermined first threshold and the evaluation
value of the character recognized as indicating deletion
of the specific character in the text area is greater than
or equal to the predetermined second threshold, executing a process of deleting the specific character in
the text area from the character string displayed in the
display area.

14. The input processing method as claimed in claim 13, wherein the strokes of the handwriting input are displayed in red, blue, or a display color different from a display color of the specific character.

15. An input processing device, comprising:
a processor configured to:
receive a handwriting input to a display area on a display
screen of a touch panel on which a character string is
displayed in the display area;
in response to a determination that a proportion of an area
in an input character area, identified based on strokes of
the handwriting input, overlapping a text area of a
specific character in the character string displayed in
the display area is greater than or equal to a predetermined first threshold,
recognize a character corresponding to the strokes of the
handwriting input in the input character area to obtain
the character recognized and an evaluation value of the
character recognized, wherein the evaluation value is a
value that represents a certainty of a character recognized from the strokes of the handwriting input;
determine whether the proportion of the area in the input
character area overlapping the text area of the specific
character in the character string displayed in the display
area is greater than or equal to the predetermined first
threshold and the evaluation value of a character recognized as indicating deletion of the specific character
in the text area is greater than or equal to a predetermined second threshold; and
in response to a determination that the proportion of the
area in the input character area overlapping the text
area of the specific character in the character string
displayed in the display area is greater than or equal to
the predetermined first threshold and the evaluation
value of the character recognized as indicating deletion
of the specific character in the text area is greater than
or equal to the predetermined second threshold,
execute a process of deleting the specific character in the
text area from the character string displayed in the
display area.

16. The input processing device as claimed in claim 15, wherein
the processor is further configured to:
obtain display information related to a display position
and a size of each character in a text displayed by a first
application; and
in response to a handwriting correction input with respect
to a display of a first character group included in the
display text of the first application, identify the first
character group based on the display information and a
position of the handwriting correction input.

17. An input processing device, comprising:
a processor configured to:
receive a handwriting input to a display area on a display
screen of a touch panel on which a character string is
displayed in the display area;
in response to a determination that a proportion of an area
in an input character area, identified based on strokes of
the handwriting input, overlapping a text area of a
specific character in the character string displayed in
the display area is greater than or equal to a predetermined first threshold,
execute a process of identifying an input position of a
character recognized with respect to the strokes of the
handwriting input as a position of the specific character
in the display area;
recognize the character corresponding to the strokes of the
handwriting input in the input character area to obtain
the character recognized and an evaluation value of the
character recognized, wherein the evaluation value is a
value that represents a certainty of a character recognized from the strokes of the handwriting input;
determine whether the proportion of the area in the input
character area overlapping the text area of the specific
character in the character string displayed in the display
area is greater than or equal to the predetermined first
threshold and the evaluation value of a character recognized as indicating deletion of the specific character
in the text area is greater than or equal to a predetermined second threshold; and
in response to a determination that the proportion of the
area in the input character area overlapping the text
area of the specific character in the character string
displayed in the display area is greater than or equal to
the predetermined first threshold and the evaluation
value of the character recognized as indicating deletion
of the specific character in the text area is greater than
or equal to the predetermined second threshold,
execute a process of deleting the specific character in the
text area from the character string displayed in the
display area.

* * * * *